United States Patent [19]
Bailey et al.

[11] Patent Number: 4,713,407
[45] Date of Patent: Dec. 15, 1987

[54] FLAME RETARDANT POLYESTER RESIN COMPOSITION

[75] Inventors: Philip E. Bailey, Worthington; Gordon E. Pickett, Reynoldsburg; Manfred Luttinger, Columbus, all of Ohio; Takashi Umeda, Ichihara, Japan

[73] Assignee: Idemitsu Petrochemical Co., Ltd., Tokyo, Japan

[21] Appl. No.: 882,587

[22] Filed: Jul. 7, 1986

Related U.S. Application Data

[63] Continuation-in-part of Ser. No. 824,449, Jan. 31, 1986, abandoned.

[51] Int. Cl.$^4$ .............................................. C08K 5/15
[52] U.S. Cl. .................................... 524/109; 524/281; 524/371; 524/405; 524/410; 524/469; 524/451; 524/605
[58] Field of Search ............... 524/451, 405, 281, 109, 524/371, 410, 469, 605

[56] References Cited

U.S. PATENT DOCUMENTS

| | | | |
|---|---|---|---|
| 3,960,807 | 6/1976 | McTaggart | 524/605 |
| 4,000,109 | 12/1976 | Smith et al. | 524/605 |
| 4,035,333 | 7/1977 | Kamada et al. | 524/605 |
| 4,242,473 | 12/1980 | Nametz et al. | 524/605 |
| 4,344,874 | 8/1982 | Akagi et al. | 524/605 |
| 4,456,723 | 6/1984 | Breitenfellner et al. | 524/605 |
| 4,567,242 | 1/1986 | Nishibori et al. | 524/371 |

Primary Examiner—Veronica P. Hoke
Attorney, Agent, or Firm—Frishauf, Holtz, Goodman & Woodward

[57] ABSTRACT

The present invention relates to a polyester resin composition, and more particularly, to a polyester resin composition having excellent properties in flame retardance, mechanical property, heat resistance and moldability. Said polyester resin composition comprises 100 parts by weight of polyester resin (A), from 20 to 70 parts by weight of glass fibers (B), from 2 to 8 parts by weight of a crystallization-accelerating agent (C), from 10 to 25 parts by weight of flame retardant (D) and, as a auxiliary flame retardant (E), from 1 to 10 parts by weight of an antimony compound and from 2 to 12 parts by weight of a boric acid salt.

10 Claims, No Drawings

FLAME RETARDANT POLYESTER RESIN COMPOSITION

This application is a continuation-in-part of application Ser. No. 824,449 filed Jan. 31, 1986 now abandoned.

BACKGROUND OF THE INVENTION

The present invention relates to a polyester resin composition, and more particularly, to a polyester resin composition which is excellent in flame retardance, mechanical properties, heat resistance, and moldability, and thus is suitable for use in production of moldings for cars, home electric appliances, and so forth.

In recent years, a glass fiber-reinforced polyester resin has been increasingly demanded because of its excellent heat resistance and mechanical properties. In applications of car parts, home electric appliances and so forth, such a polyester resin has been needed to increase its flame retardance.

To impart flame retardance to a polyester resin, a flame retardant and an auxiliary flame retardant are usually added to the resin. In general, however, an auxiliary flame retardant acts on the polyester resin and decreases its molecular weight, thereby causing a problem that the mechanical properties, heat resistance and moldability of the polyester resin are seriously decreased.

SUMMARY OF THE INVENTION

The present invention is intended to overcome the above problems and an object of the present invention is to provide a polyester resin which is increased in flame retardance without reducing its mechanical properties and so forth.

It has now been found that the object can be attained by using a combination of an antimony compound and a boric acid salt as an auxiliary flame retardant.

The present invention relates to a polyester resin composition comprising:
(A) 100 parts by weight of a polyester resin;
(B) from 20 to 70 parts by weight of glass fibers having a length of from 0.1 to 6 mm;
(C) from 2 to 8 parts by weight of a crystallization-accelerating agent selected from the group consisting of talc having an average particle diameter of from 0.5 to 10μ, ionomer having a melt index of from 0.5 to 5 g/10 min. and a mixture thereof.
(D) from 10 to 25 parts by weight of a flame retardant selected from the group consisting of tetrachlorobisphenol A oligomer, halogentated polycarbonate oligomer, terminal epoxy compound of tetrabromobisphenol A oligomer, halogenated polystyrene and poly(dibromophenylene oxide); and
(E) as an auxiliary flame retardant, from (to 10 parts by weight of an antimony compound selected from the group consisting of antimony trioxide and sodium antimonate, and from 2 to 12 parts by weight of a boric acid salt selected from the group consisting of zinc borate and lead borate.

DETAILED DESCRIPTION OF THE INVENTION

The polyester resin (A) of the present invention is a polyester resin composed mainly of an aromatic dicarboxylate unit represented by the following general formula:

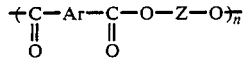

(wherein Ar is an aromatic hydrocarbon group, Z is a divalent group, and n is a number of from 1 to 200), which is derived from a difunctional carboxylic acid component and a diol component. The inherent viscosity of the polyester resin is usually from 0.4 to 1.5 dl/g and preferably 0.5 to 1.2 dl/g.

Typical examples of the difunctional carboxylic acid component are aromatic dicarboxylic acids such as therephthalic acid, isophthalic acid, and naphthalenedicarboxylic acid. Of these compounds, terephthalic acid is preferably used. Other difunctional carboxylic acids can be used in combination within a range that the effects of the present invention are not reduced. Typical examples of the other difunctional carboxylic acids are aliphatic dicarboxylic acids, such as oxalic acid, malonic acid, adipic acid, suberic acid, azelaic acid, sebacic acid and decanedicarboxylic acid, and their ester-forming derivatives. In general, the proportion of the other difunctional carboxylic acid compounded should be controlled to not more than 20 mole% based on the total amount of dicarboxylic acids used.

The diol component is not critical. For example, various diol compounds such as alkylene glycol, polyalkylene glycol, aromatic diol and bridged hydrocarbon diol can be used alone or in combination with each other. Typical examples of the alkylene glycol are ethylene glycol, propylene glycol and tetramethylene glycol. Typical examples of the polyalkylene glycol are diethylene glycol, triethylene glycol, polyethylene glycol, polypropylene glycol, polytetramethylene glycol and poly(alkeneoxide)-α,ω-diol such as poly(tetramethyleneoxide)-α,ω-diol.

The polyester resin can be prepared by polymerizing under heating the difunctional carboxylic acid component and the diol component in the presence or absence of a polycondensation catalyst containing, for example, titanium, germanium and antimony, while with drawing by-produced water or lower alcohols from the reaction system according to the usual procedure.

Particularly preferred examples of the polyester resin are a polyethylene terephthalate resin having an inherent viscosity of not less than 0.5 dl/g, particularly from 0.55 to 1.0 dl/g, and a polybutylene terephthalate resin having an inherent viscosity of not less than 0.6 dl/g, particularly from 0.65 to 1.5 dl/g. The inherent viscosity is determined at 30° C. using a mixed solvent of phenol/tetrachloroethane=1/1 (parts by weight).

As the glass fibers (B) of the present invention, any of E-glass, C-glass, and A-glass can be used. Particularly preferred are glass fibers having, in the polyester resin composition, a length of from 0.02 to 2 mm, more particularly from 0.05 to 1 mm. Since, however, these glass fibers are sometimes cut when kneading with the above polyester resin, it is usually preferred for them to be from 0.1 to 6 mm in length. The diameter of these glass fibers is usually sufficient to be from 1 to 20μ. Also the glass fibers are not critical in shape; for example, they may be in the form of roving, milled fiber, or chopped strand. It is preferred for the glass fibers to be subjected to surface treatment such as silane treatment, borane treatment and chromium treatment, and be bundled with an epoxy resin. This surface treatment increases the adhesion between the polyester resin and the glass fibers. The amount of the glass fibers (B) compounded is from 20 to 70 parts by weight per 100 parts by weight of the polyester resin (A). Below 20 parts by weight, impact resistance and stiffness are poor. Above 70 parts by weight, specific gravity is increased and moldability is reduced.

As the crystallization-accelerating agent (C) of the present invention, inorganic and organic crystallization-accelerating agents can be used. Typical example of the iorganic crystallization-accelerating agent is talc. Typical example of the organic crystallization-accelerating agent is ionomer such as HI-MILAN (trade name, produced by Mitsui Du Pont Polychemical Co., Ltd.) as prepared by acting metal cation of e.g., sodium and zinc on a base copolymer of ethylene and methacrylic acid or acrylic acid. These compounds can be used in combination. Especially, talc having an average particle diameter of from 0.5 to 10$\mu$, particularly from 1 to 8$\mu$ and an ionomer having a melt index (MI) of from 0.5 to 5 g/10 min. are preferred.

The amount of the crystallization-accelerating agent (C) being compounded is from 2 to 8 parts by weight per 100 parts by weight of the polyester resin (A). If the amount of the agent (C) compound is in excess of 8 parts by weight, properties such as stiffness are reduced. When the polyester resin (A) is a polyethylene terephthalate resin, the amount of the crystallization-accelerating agent (C) compounded is preferably from 2 to 8 parts by weight per 100 parts by weight of the polyester resin (A). In the case of a polybutylene terephthalate resin, it is not always necessary to compound the crystallization-accelerating agent.

As the flame retardant (D) of the present invention, organic halogen-containing compounds can be used. Preferred organic halogen-containing flame retardants which can be used include tetrabromobisphenol A oligomers, halogenated polycarbonate oligomers, halogenated epoxy compounds such as terminal epoxy compounds of tetrabromobisphenol A oligomers, halogenated polystyrenes such as polychlorostyrene, polytribromostyrene, etc. and poly(dibromophenylene oxide). Of these compounds, brominated epoxy compounds, particularly terminal epoxy compounds of tetrabromobisphenol A oligomers, and brominated polystyrene, particularly polytribromostyrene are suitable.

The amount of the flame retardant (D) compounded is from 10 to 25 parts by weight per 100 parts by weight of the polyester resin (A). If the amount of the flame retardant compounded is less than 10 parts by weight, flame retardance is poor. On the other hand, if it is in excess of 25 parts by weight, bleed coloration occurs.

In the present invention, it is important that as the auxiliary flame retardant (E), an antimony compound and a boric acid salt are used in combination. Antimony compounds which can be used preferably include antimony trioxide and sodium antimonate. Boric acid salts which can be used preferably include zinc borates such as zinc tetraborate, zinc metaborate, and basic zinc borate and lead borate.

The amount of the auxiliary flame retardant (E) compounded is from 3 to 15 parts by weight, preferably from 5 to 12 parts per 100 parts by weight of the polyester resin (A). If the amount of the auxiliary flame retardant (E) compounded is less than 3 parts by weight, the effect of increasing flame retardance is not sufficiently high. On the other hand, if it is in excess of 15 parts by weight, the molecular weight of the polyester resin (A) is decreased, resulting in a serious reduction in mechanical properties, heat resistance and moldability.

More preferably the antimony compound is added in an amount of from 1 to 10 parts by weight, especially from 2 to 8 parts by weight per 100 parts by weight of the polyester resin (A), and the boric acid salt is added in an amount of from 2 to 12 parts by weight, especially from 3 to 10 parts by weight per 100 parts by weight of the polyester resin (A).

To the resin composition of the present invention can further be compounded an antioxidant in an amount of not more than 1 part by weight, preferably from 0.1 to 0.8 part by weight per 100 parts by weight of the polyester resin (A). Addition of the antioxidant permits to prevent burning of the polyester resin during the molding process, to improve the appearance of the final molding, and moreover to prevent degradation due to oxidation of the molding, thereby preventing a reduction in mechanical strength.

Examples of the antioxidant are phenol compounds such as 2,6-di-tert-butyl-p-cresol, butylated hydroxyanisol, 2,6-di-tert-butyl-4-ethylphenol, stearyl-$\beta$-(3,5-di-tert-butyl-4-hydroxyphenyl)propionate, 2,2'-methylene-bis(4-methyl-6-tert-butylphenol), 2,2'-methylene-bis(4-ethyl-6-tert-butylphenol), 4,4'-thio-bis(3-methyl-6-tert-butylphenol), 4,4'-butylidene-bis (3-methyl-6-tert-butylphenol), tetraquis[methylene-3-(3',5'-di-tert-butyl-4-hydroxyphenyl)propionate]methane, and 1,1,3-tris(2-methyl-4-hydroxy-5-tert-butylphenyl)butane; amine compounds such as phenyl-$\beta$-napthylamine and N,N'-diphenyl-p-phenylenediamine; phosphorous-containing compounds such as tris(nonylphenyl) phosphite, triphenyl phosphite, trioctadecyl phosphite, and diphenylisodecyl phosphite; and sulfur-containing compounds such as dilaurylthio dipropionate, dimyristylthio dipropionate, and distearylthio dipropionate. As the antioxidant, it is preferred to use a phenol compound in combination with a phosphorus-containing compound.

In addition, various additives, for example, auxiliary flame retardants other than the above-defined ones such as zirconium oxide, ultraviolet ray-absorbing agents, antistatic agents, lubricants, releasing agents, and colorants may be compounded to the polyester resin composition of the present invention.

Examples of the ultraviolet ray-absorbing agent are salicylic acid-based ultraviolet ray-absorbing agents such as phenyl salicylate, and p-tert-butylphenyl salicylate; benzotriazole-based ultraviolet ray-absorbing agents such as 2-(2'-hydroxy-5'-methylphenyl)-benzotriazole, and 2-(2'-hydroxy-5'-tert-butylphenyl)-benzotriazole; and 2,4-dihydroxybenzophenone.

Examples of the antistatic agent are nonionic antistatic agents such as polyoxyethylenealkylamine and polyoxyethylenealkylamide; anionic antistatic agents such as alkyl sulfonate and alkylbenzene sulfonate; cationic antistatic agents such as quaternary ammonium chloride and quaternary ammonium sulfate; and amphoteric antistatic agents such as alkylbetaine-based compounds and alkylimidazoline-based compounds.

Examples of the lubricant are aliphatic hydrocarbons, higher aliphatic alcohols, aliphatic amides, metallic soaps, and aliphatic esters.

Examples of the releasing agent are carnauba wax, paraffin wax and silicone oils.

As the colorants, usual colorants used for coloration of plastics can be used.

The polyester resin composition of the present invention can be prepared by compounding the above polyester resin, glass fibers, crystallization-accelerating agent, flame retardant, and auxiliary flame retardant, and also the above various additives. There are no special limitations to the compounding procedure. For example, a method which all ingredients are preliminary mixed, and the resulting mixtured is kneaded; a method in which a polyethylene terephthalate resin and a polybutylene terephthalate resin are preliminarily mixed or kneaded, a crystallization-accelerating agent is added, and finally glass fibers are added and kneaded, and a method in which glass fibers are added at a stage of polycondensation of a polyethylene terephthalate or polybutylene terephthalate or after the polycondensation of said resin, and then the other components are added and mixed or kneaded can be employed. The above mixing can be carried out by the use of e.g., a ribbon blender, a tumble mixer, and a Henschel mixer. Kneading can be carried out by the use of e.g., an open roll, a Banbury's mixer, a Henschel mixer, a single-screw extuder, a twin-screw extruder, and a single-screw reciprocating kneader.

The polyester resin composition of the present invention can be molded by various molding techniques such as injection molding, extrusion molding, and the like.

The polyester resin composition of the present invention is excellent in flame retardance, mechanical properties, heat resistance and moldability. Thus the polyester resin composition of the present invention is quite useful as a material for molding of car parts, home electric appliances and so forth.

The present invention is described below in greater detail with reference to the following examples.

EXAMPLES 1 TO 3, AND COMPARATIVE EXAMPLES 1 TO 6

To 100 parts by weight of a polyethylene terephthalate resin (PET) (inherent viscosity: 0.68 dl/g, produced by Kuraray Co., Ltd.) were compounded glass fibers (bundled with an epoxy resin; length: 3 mm; diameter: 9μ; produced by Nitto Boseki Co., Ltd.; trade name: CS3J-941), talc (average particle diameter: 2.8μ; produced by Hayashi Kasei Co., Ltd.; trade name: MW-5000S), a flame retardant, and an auxiliary flame reterdant in the amounts shown in Table 1. The resulting mixture was kneaded at a temperature of 280° C. by the use of a twin-screw extruder and pelletized. The pellets thus obtained were dried and then injection molded at a cylinder temperature of 270° C. and a mold temperature of 140° C. to produce a test piece.

This test piece was measured for flame retardance according to U.S. Standards UL94, and for flexural strength according to JIS K7203. The results are shown in Table 1.

EXAMPLES 4 TO 6, AND COMPARATIVE EXAMPLES 7

In Example 1, in place of the talc, an ionomer (MI: 0.9 g/10 min; produced by Mitsui Du Pont Polychemical Co., trade name: HI-MILAN 1707) was used, and 0.3 part by weight of tetraquis [methylene-3-(3',5'-di-tert-butyl-4-hydroxyphenyl)propionate] methane (phenol-based antioxidant produced by Ciba Geigy Co., Ltd.; trade name: Irganox 1010) and 0.7 part by weight of tris(nonylphenyl) phosphite (phosphorus-containing antioxidant produced by Ciba Geigy Co., Ltd.; trade name: Phosphite 168) were added. The resulting mixture was injection molded at a mold temperature of 110° C. to produce a test piece. This test piece was measured for physical properties. The results are shown in Table 1.

EXAMPLE 7

The procedure of Example 1 was repeated wherein a polybutylene terephthalate resin (PBT) (inherent viscosity: 0.80 dl/g; produced by Dai Nippon Ink Kagaku Co., Ltd.; trade name: PBT120) was used in place of PET. The results are shown in Table 1.

EXAMPLE 8

The procedure of Example 1 was repeated wherein a mixed polyester resin of PET/PBT=50/50 (parts by weight) was used in place of PET. The results are shown in Table 1.

Test results of Example 1 are superior than these of Comparative Examples 1 and 2. Same conclusion is obtained from the comparison of Example 3 with Comparative Examples 3 and 4.

TABLE 1

| Run No. | Type of Polyester Resin | Glass Fibers (parts by weight) | Crystallization Accelerating Agent | | Flame Retardant | | Auxiliary Flame Retardant | | Test Results | |
|---|---|---|---|---|---|---|---|---|---|---|
| | | | Type | (parts by weight) | Type | (parts by weight) | Antimony trioxide | Zinc borate*3 | Flame Retardance | Flexural Strength (kg/cm$^2$) |
| Example 1 | PET | 55 | talc | 3 | A*1 | 15 | 4 | 7 | 1/36" V-O | 2000 |
| Example 2 | " | 70 | " | 3 | A | 15 | 4 | 7 | 1/36" V-O | 2300 |
| Example 3 | " | 30 | " | 8 | B*2 | 15 | 4 | 7 | 1/36" V-O | 1800 |
| Comparative Example 1 | PET | 55 | talc | 3 | A | 15 | — | 10 | 1/36" V-O | 1850 |
| Comparative Example 2 | " | 55 | " | 3 | B | 15 | 8 | — | 1/36" V-O | 1850 |
| Comparative Example 3 | " | 30 | " | 8 | A | 15 | — | 10 | 1/36" V-O | 1600 |
| Comparative Example 4 | " | 30 | " | 8 | B | 15 | 8 | — | 1/36" V-O | 1600 |
| Comparative Example 5 | " | 55 | " | 3 | A | 15 | 15 | 15 | 1/36" V-O | 1650 |
| Comparative Example 6 | " | 55 | " | 3 | A | 35 | 4 | 7 | 1/36" V-O | 1700 |
| Example 4 | PET | 50 | ionomer | 6 | A | 15 | 4 | 7 | 1/36" V-O | 1900 |
| Example 5 | " | 50 | " | 6 | B | 18 | 4 | 7 | 1/36" V-O | 1850 |
| Example 6 | " | 50 | " | 8 | B | 18 | 6 | 4 | 1/36" V-O | 1800 |
| Comparative Example 7 | PET | 5 | ionomer | 6 | B | 15 | 4 | 7 | 1/36" V-O | 1000 |
| Example 7 | PBT | 55 | talc | — | B | 18 | 3 | 8 | 1/36" V-O | 1900 |

TABLE 1-continued

| Run No. | Type of Polyester Resin | Glass Fibers (parts by weight) | Crystallization Accelerating Agent | | Flame Retardant | | Auxiliary Flame Retardant | | Test Results | |
|---|---|---|---|---|---|---|---|---|---|---|
| | | | Type | (parts by weight) | Type | (parts by weight) | Antimony trioxide | Zinc borate[*3] | Flame Retardance | Flexural Strength (kg/cm$^2$) |
| Example 8 | PET/PBT | 55 | " | 2 | B | 18 | 4 | 6 | 1/36" V-O | 1950 |

[*1]Terminal epoxy compound of tetrabromobisphenol A oligomer (produced by Makhteshin Chemical Works; trade name: Thermoguard 2300)
[*2]Polytribromostyrene (weight average molecular weight: about 300,000; produced by Ciba Geigy Co., Ltd.; trade name: Pyrochek 68PB)
[*3]Produced by U.S. Borax Research Corp.; trade name: Fire Brake ZB

What is claimed is:

1. A polyester resin composition comprising: 100 parts by weight of a polyethylene terephthalate polyester resin (A) having an inherent viscosity of not less than 0.55 to 1.0 dl/g, from 20 to 70 parts by weight of glass fibers having a length of from 0.1 to 6 millimeter (B), from 2 to 8 parts by weight of a crystallization-accelerating agent selected from the group consisting of talc having an average particle diameter of from 0.5 to 10 micron, an ionomer having a melt index of from 0.5 to 5 gram per 10 minutes and a mixture thereof (C), from 10 to 25 parts by weight of a flame retardant selected from the group consisting of tetrachlorobisphenol A oligomer, halogenated polycarbonate oligomer, terminal epoxy compound of tetrabromobisphenol A oligomer, halogenated polystyrene and poly(dibromophenylene oxide) (D) and, as an auxiliary flame retardant, from 2 to 8 parts by weight of an antimony trioxide, and from 3 to 10 parts by weight of zinc borate (E).

2. The composition as claimed in claim 1, wherein the component (D) is terminal epoxy compound of tetrabromobisphenol A oligomer.

3. The composition as claimed in claim 1, wherein the component (D) is polytribromostyrene.

4. The composition as claimed in claim 1, wherein the glass fibers are 0.02 to 2 mm in length.

5. The composition as claimed in claim 1 wherein the glass fibers are 0.05 to 1 mm long.

6. The composition of claim 1 further comprising 0.1 to 1 part by weight of an antioxidant for the polyester resin.

7. The composition of claim 1 wherein the flame retardant is halogenated polycarbonate oligomer.

8. The composition of claim 1 wherein the flame retardant is terminal epoxy compound of tetrabromobisphenol A oligomer.

9. The composition of claim 1 wherein the flame retardant is halogenated polystyrene.

10. The composition of claim 1 wherein the flame retardant is poly(dibromophenylene oxide).

* * * * *